(12) United States Patent
Yamashita et al.

(10) Patent No.: US 12,147,063 B2
(45) Date of Patent: Nov. 19, 2024

(54) CEMENTED LENS, OPTICAL SYSTEM INCLUDING THE SAME, OPTICAL DEVICE, AND METHOD OF MANUFACTURING CEMENTED LENS

(71) Applicant: TAMRON CO., LTD., Saitama (JP)

(72) Inventors: Naoki Yamashita, Saitama (JP); Takahito Mori, Saitama (JP)

(73) Assignee: Tamron Co., Ltd., Saitama (JP)

( * ) Notice: Subject to any disclaimer, the term of this patent is extended or adjusted under 35 U.S.C. 154(b) by 559 days.

(21) Appl. No.: 17/494,358

(22) Filed: Oct. 5, 2021

(65) Prior Publication Data

US 2022/0179131 A1   Jun. 9, 2022

(30) Foreign Application Priority Data

Dec. 4, 2020   (JP) ................. 2020-202240

(51) Int. Cl.
*G02B 3/04* (2006.01)
*G02B 1/11* (2015.01)

(52) U.S. Cl.
CPC . *G02B 3/04* (2013.01); *G02B 1/11* (2013.01)

(58) Field of Classification Search
CPC .......... G02B 7/025; G02B 5/003; G02B 3/04; G02B 1/11; G02B 13/006; G02B 3/00
See application file for complete search history.

(56) References Cited

U.S. PATENT DOCUMENTS

| 2015/0097109 A1* | 4/2015 | Maetaki .................. G02B 1/12 |
| | | 359/797 |
| 2019/0116300 A1* | 4/2019 | Okuno ........... G02B 15/144113 |
| 2020/0049862 A1* | 2/2020 | Ogane .................... G02B 7/028 |
| 2020/0308415 A1* | 10/2020 | Yamamoto ............... C09D 1/00 |

FOREIGN PATENT DOCUMENTS

| JP | 2014059384 A | * | 4/2014 |
| JP | 2015-108642 A | | 6/2015 |
| JP | 2020-024331 A | | 2/2020 |

OTHER PUBLICATIONS

Machine translation of JP-2014059384-A (Year: 2014).*

* cited by examiner

*Primary Examiner* — Darryl J Collins
*Assistant Examiner* — Matthew Y Lee
(74) *Attorney, Agent, or Firm* — Paratus Law Group, PLLC

(57) ABSTRACT

In a cemented lens according to one aspect of the present invention, a first optical element provided with a first light shielding film and a second optical element provided with a second light shielding film are cemented by an adhesive layer, and the adhesive layer is exposed from between the first light shielding film and the second light shielding film.

10 Claims, 7 Drawing Sheets

CEMENTED LENS, OPTICAL SYSTEM INCLUDING THE SAME, OPTICAL DEVICE, AND METHOD OF MANUFACTURING CEMENTED LENS

CROSS-REFERENCE TO RELATED APPLICATIONS

This application is based on and claims the benefit of priority from Japanese Patent Application No. 2020-202240, filed on Dec. 4, 2020, the entire contents of which are incorporated herein by reference.

BACKGROUND OF THE INVENTION

Technical Field

The present invention relates to a cemented lens used for an imaging device such as a camera, an optical system including the cemented lens, an optical device, and a method of manufacturing the cemented lens.

Related Art

In order to correct chromatic aberration, a cemented lens in which a plurality of glass lenses having different refractive indexes are bonded by an organic bonding adhesive is widely used in an imaging device such as a camera. Furthermore, in the lens used in the imaging device, a black opaque light shielding layer (black coating film) is formed in a non-optical effective region (flange portion) in order to reduce internal reflection that causes ghost, flare, and the like. In the cemented lens, a black coating film is formed on a flange portion for the same purpose. For example, in the cemented lens disclosed in JP 2015-108642 A, a solvent-free epoxy resin mixed with carbon black is applied to an outer peripheral end portion of an adhesive sandwiched and spread by a convex lens and a concave lens. Further, in JP 2020-24331 A, in a cemented lens in which a first optical element and a second optical element are cemented by a third optical element containing resin, a light shielding film covers surfaces of the third optical element not in contact with the first and second optical elements.

In general, a light shielding film (black coating film) needs to be thermally cured at a high temperature after coating. On the other hand, in a cemented lens, a cemented interface is easily peeled off due to a difference in linear expansion coefficient between a glass lens and a layer of the bonding adhesive. Therefore, the light shielding film applied to the cemented lens is thermally cured at a lower temperature than a case where the light shielding film of the single lens is thermally cured. However, the case where the light shielding film is cured at a low temperature causes following problems as compared with a case where the light shielding film is cured at a high temperature.

First, in the low-temperature curing, volatilization of the solvent contained in the light-shielding film is not sufficient. Therefore, the solvent may infiltrate the layer of the bonding adhesive in contact with the light shielding film to cause deterioration (discoloration), which may significantly deteriorate the optical performance and function of the cemented lens.

In addition, in the low-temperature curing, the light shielding film is harder to be cured than in the high-temperature treatment. Therefore, when the cemented lens on which the light shielding film is formed is cleaned with a cleaning liquid such as isopropyl alcohol, the dye contained in the light shielding film is eluted into the cleaning liquid, leading to deterioration of performance as the light shielding film. In addition, since the curing is less likely to proceed as compared with the high temperature treatment, the adhesion to the cemented lens is not sufficient, and the light shielding film may be peeled off by ultrasonic cleaning or the like.

In addition, moisture absorbed in the layer of the bonding adhesive containing the resin under a high temperature and high humidity environment is released from the end portion not in contact with the lens. However, since the light shielding film is formed at the end portion, the release of moisture is hindered, moisture is supersaturated at the end portion, dew condensation is generated at the interface between the layer of the bonding adhesive and the lens, whitening occurs, and optical performance is deteriorated.

An aspect of the present invention has been made in view of the above problems, and an object thereof is to provide a technique for preventing occurrence of an optical defect of a cemented lens caused by a light shielding film.

SUMMARY OF THE INVENTION

In order to solve the above problems, a cemented lens according to an aspect of the present invention is a cemented lens including: a first optical element in which a first light shielding film is formed in a non-optical effective region of a base material; a second optical element in which a second light shielding film is formed in a non-optical effective region of a base material; and an adhesive layer that bonds an optical effective region of the first optical element and an optical effective region the second optical element to each other, in which the adhesive layer is exposed from between the first light shielding film and the second light shielding film.

In order to solve the above problems, an optical system according to an aspect of the present invention includes the cemented lens.

In order to solve the above problems, an optical device according to an aspect of the present invention includes a cemented lens and a light receiving element that receives light condensed by the cemented lens.

According to the above configuration, it is possible to provide a technique for preventing occurrence of an optical defect of the cemented lens caused by the light shielding film.

In order to solve the above problems, a method of manufacturing a cemented lens according to an aspect of the present invention includes bonding an optical effective region of a first optical element in which a first light shielding film is formed in a non-optical effective region of a base material and an optical effective region of a second optical element in which a second light shielding film is formed in a non-optical effective region of a base material to each other with an adhesive layer interposed therebetween.

According to the above configuration, it is possible to provide a technique for preventing occurrence of an optical defect of the cemented lens caused by the light shielding film.

According to an aspect of the present invention, it is possible to provide a technique for preventing occurrence of an optical defect of a cemented lens caused by a light shielding film.

DESCRIPTION OF THE EMBODIMENTS

First Embodiment

Hereinafter, an embodiment of the present invention will be described with reference to FIGS. 1 to 6.

1. Cemented Lens

Figure 1:
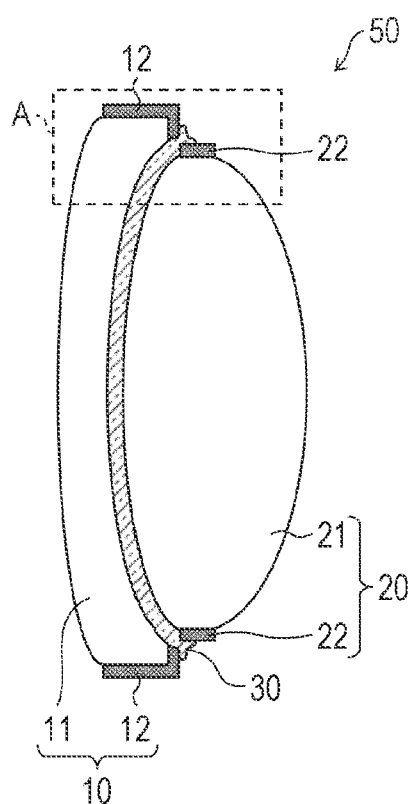
FIG. 1 is a cross-sectional view illustrating a configuration of a cemented lens according to an embodiment of the present invention.
Figure 2:
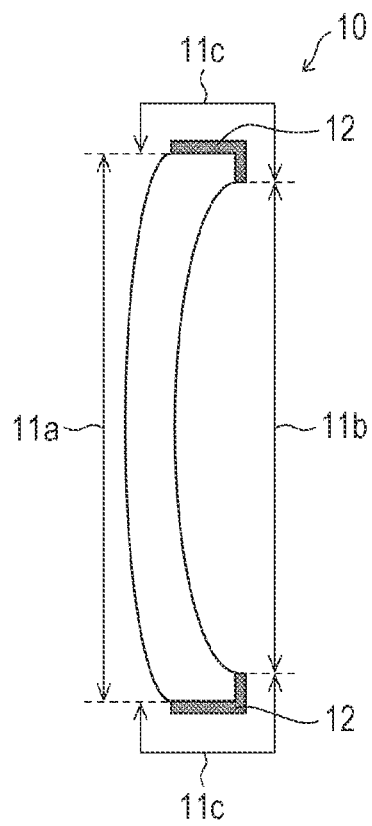
FIG. 2 is a cross-sectional view illustrating a configuration of a first optical element of the cemented lens illustrated in FIG. 1.
Figure 3:
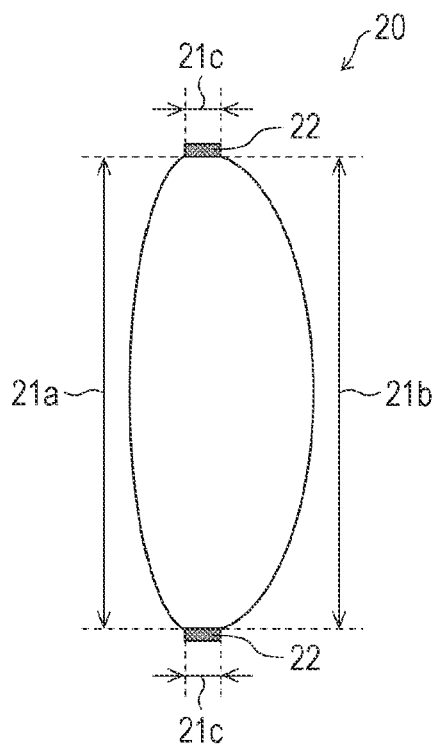
FIG. 3 is a cross-sectional view illustrating a configuration of a second optical element of the cemented lens illustrated in FIG. 1.

FIG. 1 is a cross-sectional view of a cemented lens 50 according to the present embodiment. The cemented lens 50 can be applied to various optical elements constituting various optical systems such as an imaging optical system such as a lens, a prism (color separation prism, color synthesis prism, and the like), a polarization beam splitter (PBS), and a cut filter (for infrared rays, ultraviolet rays, etc.), and a projection optical system, and the type of the optical element is not limited.

In the cemented lens 50, a first optical element 10 and a second optical element 20 are bonded to each other with an adhesive layer 30 interposed therebetween.

(1) First Optical Element 10

The first optical element 10 includes a base material 11 and a first light shielding film 12. The first optical element 10 may include other layers.

<Base Material 11>

The base material 11 may be made of glass or plastic, and the material thereof is not particularly limited as long as it is formed using an optical material. A concave meniscus lens can be adopted as the base material 11, but the present invention is not limited thereto.

The base material 11 has optical effective regions 11a and 11b through which an effective light flux contributing to image formation passes, and non-optical effective region 11c outside the optical effective regions 11a and 11b. Here, the optical effective regions 11a and 11b refer to regions where the maximum diameter of the optical path when the effective light flux passes through the optical surface of the base material 11 intersects the optical surface. In FIG. 1, the optical effective region 11a is provided on the convex surface side, and the optical effective region 11b is provided on the concave surface side. In addition, the non-optical effective region 11c generally corresponds to a region called a flange surface or a flange portion. Note that the shapes, ranges, and the like of the optical effective regions 11a and 11b and the non-optical effective region 11c illustrated in FIG. 1 are merely examples, and the shapes, ranges, and the like of the optical effective regions and the non-optical effective regions are appropriately changed according to the optical characteristics of the cemented lens 50, the specific shape thereof, and the like.

<First Light Shielding Film 12>

The first light shielding film 12 is formed in the non-optical effective region 11c of the base material 11. The first light shielding film 12 is a layer opaque to incident light. The first light shielding film 12 may have any configuration as long as it can be a film opaque to incident light and, for example, can be a light-absorbing film containing a substance (hereinafter, referred to as a light absorbing material) that absorbs incident light and converts the incident light into energy. Specifically, when the wavelength range of light used by the cemented lens 50 is a visible light range to a near-infrared range of about 400 nm to 800 nm, a substance having a high absorptivity of light having wavelengths in the visible light range and the near-infrared range, such as carbon, a black pigment, or a black dye, can be used as the light absorbing material. A coating liquid in which these light absorbing materials are dissolved or dispersed in a solvent together with a binder component (resin component) such as an epoxy resin is prepared, this coating liquid is applied to the surface of the non-optical effective region 11c to form a coating film, and then the first light shielding film 12 can be formed through a step such as drying. In addition, a commercially available inner surface antireflection coating material used when so-called black coating is applied to a lens or a lens barrel can be used as a coating liquid, and the coating film can be used as the first light shielding film 12.

The average absorption coefficient $\beta$ of the first light shielding film 12 is preferably $1.0 \times 10^4$ m$^{-1}$ or more. Furthermore, from the viewpoint of further enhancing the effect of preventing internal reflection, the light absorption coefficient $\beta$ is more preferably $1.0 \times 10^5$ m$^{-1}$ or more.

The refractive index of the first light shielding film 12 preferably has a small difference from the refractive index of the base material 11. Specifically, since the refractive index of the base material 11 is generally about 1.4 to 2.1, the refractive index of the first light shielding film 12 is preferably 1.4 to 1.8. Here, the refractive index of the first light shielding film 12 is determined by the refractive index of each component (light absorbing material and the like and binder component) constituting the first light shielding film 12 and the blending ratio thereof. When the ratio of the binder component of the first light shielding film 12 increases, the refractive index and the light absorption coefficient of the first light shielding film 12 decrease, but the strength is improved. On the other hand, when the ratio of the binder component of the first light shielding film 12 decreases, the refractive index and the light absorption coefficient of the first light shielding film 12 increase, but the strength decreases.

(2) Second Optical Element 20

The second optical element 20 includes a base material 21 and a second light shielding film 22.

<Base Material 21>

The base material 21 may be made of glass or plastic, and the material thereof is not particularly limited as long as it is formed using an optical material. A biconvex lens can be adopted as the base material 21, but the present invention is not limited thereto.

The base material 21 has optical effective regions 21a and 21b through which an effective light flux contributing to image formation passes, and non-optical effective region 21c outside the optical effective regions. Here, the optical effective regions 21a and 21b refer to regions where the maximum diameter of the optical path when the effective light flux passes through the optical surface of the base material 21 intersects the optical surface. In FIG. 1, the optical effective region 21a is provided on the first optical element 10 side, and the optical effective region 21b is provided on the opposite side. In addition, the non-optical effective region 21c generally corresponds to a region called a flange surface or a flange portion. Note that the shapes, ranges, and the like of the optical effective regions 21a and 21b and the non-optical effective region 21c illustrated in FIG. 1 are merely examples, and the shapes, ranges, and the like of the optical effective regions and the non-optical effective region appropriately change according to the optical characteristics, the specific shape, and the like of the cemented lens 50.

<Second Light Shielding Film 22>

The second light shielding film 22 is formed in the non-optical effective region 21c of the base material 21. The second light shielding film 22 may have the same configuration as that of the first light shielding film 12, or may be a light shielding film made of a material different from that of the first light shielding film 12 among the materials of the film applicable to the first light shielding film 12 described above.

(3) Adhesive Layer 30

Figure 4:
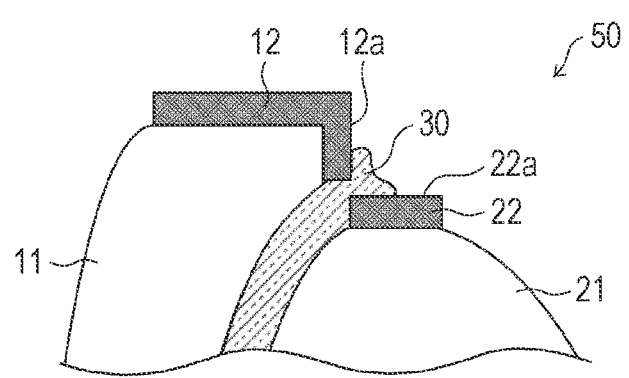
FIG. 4 is an enlarged partial view illustrating a region indicated by A in FIG. 1.

The adhesive layer 30 is formed of a bonding adhesive used to adhere and bond the optical effective region 11b of the first optical element 10 and the optical effective region 21a of the second optical element 20. The adhesive layer 30 is exposed from between the first light shielding film 12 and the second light shielding film 22. In other words, the adhesive layer 30 has an end surface that is not in contact with either the first optical element 10 or the second optical element 20. In other words, the end surface is not covered with either the first light shielding film 12 or the second light shielding film 22, and is not covered with the other light shielding films. The adhesive layer 30 is exposed from between the first light shielding film 12 and the second light shielding film 22 by being sandwiched and spread by the first optical element 10 and the second optical element 20. More specifically, as illustrated in FIG. 4, the adhesive layer 30 is exposed on the surface 12a of the first light shielding film 12 and the surface 22a of the second light shielding film 22.

The adhesive layer 30 is a layer in which an adhesive used for bonding a glass lens is cured. The adhesive preferably has high adhesive strength and a high curing speed in addition to being optically transparent, and acrylic, epoxy, and polyene-polythiol cured adhesives can be suitably used. A curing initiator is added to these adhesives, and the adhesives can be cured by heat or ultraviolet rays.

In the method of bonding the first optical element and the second optical element 20 with the adhesive layer 30 interposed therebetween (bonding step), for example, an adhesive serving as the adhesive layer 30 may be applied to either surface of the first optical element 10 or the second optical element 20, and the optical elements 10 and 20 may be bonded to each other.

Note that the optical effective regions 11a and 11b of the base material 11 of the first optical element 10 and the optical effective regions 21a and 21b of the base material 21 of the second optical element 20 are interfaces with materials having different refractive indexes and are refractive surfaces. In a case where the difference in refractive index between the materials in contact with each other at these interfaces is large, light is reflected, and thus antireflection coating (not illustrated) that alleviates the difference in refractive index is provided as necessary. The antireflection coating will be described later.

3. Zoom Lens (Optical System)

Figure 5:
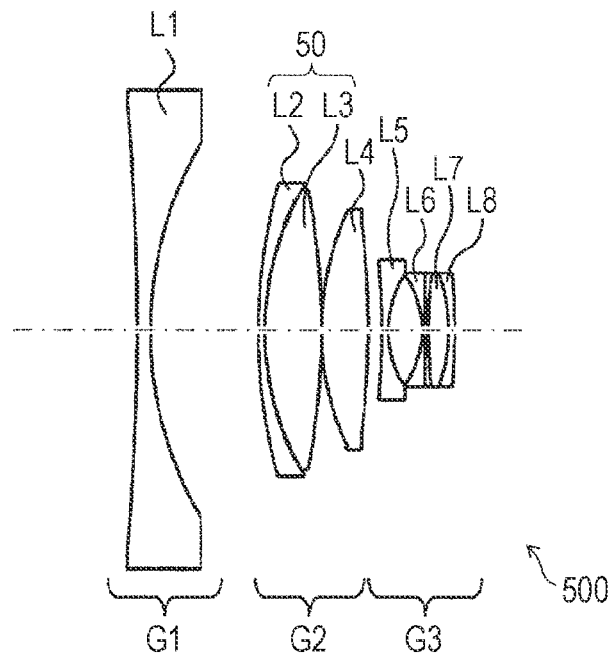
FIG. 5 is a cross-sectional view illustrating a configuration of a zoom lens as an optical system according to an embodiment of the present invention.

Next, a zoom lens which is an aspect of an optical system including the cemented lens according to the present embodiment will be described with reference to FIG. 5. FIG. 5 is a cross-sectional view of the zoom lens 500.

The zoom lens 500 includes a plurality of lens groups, and the above-described cemented lens 50 is mounted on one of the lens groups or the plurality of lens groups. As illustrated in FIG. 5, the zoom lens 500 includes, from the object side, a first lens group G1 having a first lens L1, a second lens group G2 having second to fourth lenses L2 to L4, and a third lens group G3 having fifth to eighth lenses L5 to L8. The zoom lens 500 has the second lens group G2 mounted with the cemented lens 50 in which the second lens L2 corresponds to the above-described first optical element 10, and the third lens L3 corresponds to the above-described second optical element 20.

In the present embodiment, the zoom lens has been described as an example of the optical system, but the optical system is not limited thereto. In addition, the optical system includes the cemented lens according to the present embodiment, but may include a plurality of cemented lenses. For example, a single focal lens including the cemented lens according to the present embodiment may be used.

4. Imaging Device (Optical Device)

Figure 6:
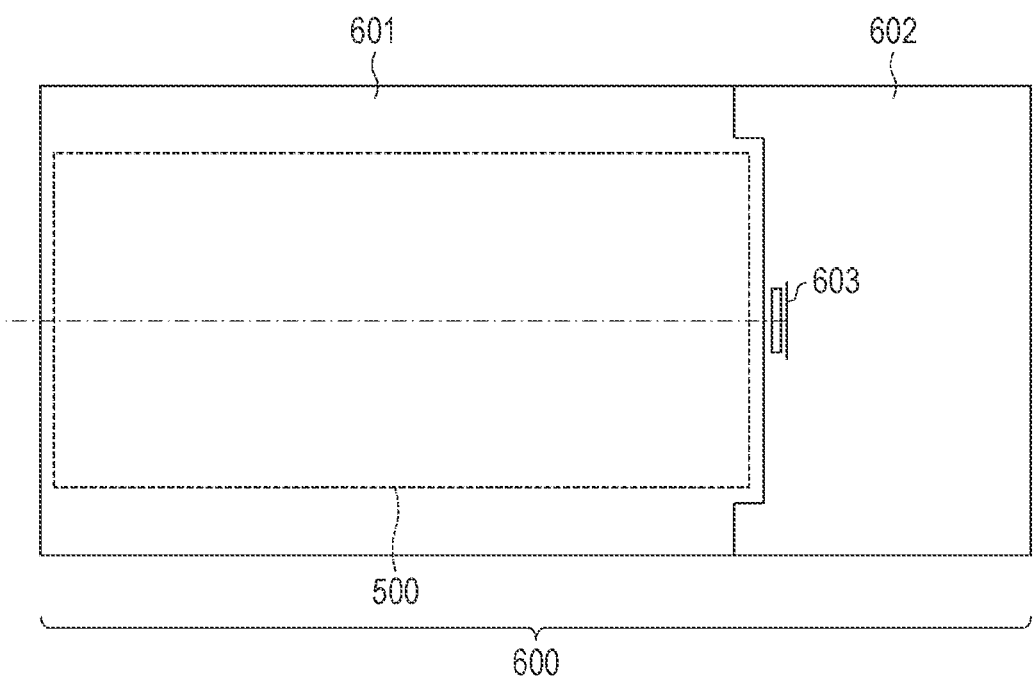
FIG. 6 is a diagram illustrating a configuration of an imaging device as an optical device according to an embodiment of the present invention.

Next, an example in which the zoom lens 500 including the cemented lens 50 according to the present embodiment is applied to an imaging device which is a manner of optical device will be described. FIG. 6 is a diagram illustrating an example of an imaging device 600 including the zoom lens 500 according to the present embodiment.

As illustrated in FIG. 6, the imaging device 600 includes a lens barrel portion 601 accommodating the zoom lens 500, and a camera body 602 including an image sensor 603 (light receiving element). Magnification or the like of the zoom lens 500 is performed by driving a mechanical mechanism (not illustrated). As the image sensor 603, for example, a photoelectric conversion element such as a charge coupled device (CCD) or a complementary metal oxide semiconductor (CMOS) can be used. In the imaging device 600, light incident from the object side of the zoom lens 500 finally forms an image on the imaging plane of the image sensor 603. Then, the image sensor 603 photoelectrically converts the received light and outputs the light as an electric signal. This output signal is subjected to arithmetic processing by a signal processing circuit (not illustrated), and a digital image corresponding to the object image is generated. The digital image can be recorded on a recording medium such as a hard disk drive (HDD), a memory card, an optical disk, or a magnetic tape. Specific examples of the imaging device 600 include a video camera, a digital still camera, a single lens reflex camera, a mirrorless camera, and the like, but are not limited thereto.

5. Effects of Present Embodiment

According to the cemented lens 50 of the present embodiment, it is possible to realize a cemented lens preventing occurrence of an optical defect of the cemented lens caused by a light shielding film.

Specifically, in the cemented lens 50, the adhesive layer 30 is not covered with either the first light shielding film 12 or the second light shielding film 22. In other words, before the adhesive layer 30 is formed, the first light shielding film 12 and the second light shielding film 22 (hereinafter, simply referred to as a light-shielding film) are formed in the respective optical elements. That is, when the light shielding films (the first light shielding film 12 and the second light shielding film 22) are formed in the non-optical effective regions 11c and 21c, it is not necessary to thermally cure the light shielding films (the first light shielding film 12 and the second light shielding film 22) at a low temperature in consideration of the adhesive layer 30, and the light shielding films can be thermally cured at a high temperature. Therefore, the solvents of the first light shielding film 12 and the second light shielding film 22 can be sufficiently volatilized. As a result, the solvent does not infiltrate the adhesive layer 30 formed between the optical elements 10 and 20. Therefore, degradation (discoloration) of the adhesive layer that may occur with infiltration does not occur, and deterioration of optical performance and function does not occur.

In addition, since the first light shielding film 12 and the second light shielding film 22 can be sufficiently cured, even if the cemented lens 50 is cleaned with a cleaning liquid such as isopropyl alcohol, dyes contained in the first light shielding film 12 and the second light shielding film 22 are not eluted into the cleaning liquid, and performance degradation as the first light shielding film 12 and the second light shielding film 22 does not occur. In addition, since the first light shielding film 12 and the second light shielding film 22 can be sufficiently cured, adhesion between the first light shielding film 12 and the second light shielding film 22 and the base materials 11 and 21 of the optical element can be secured. Therefore, peeling of the first light shielding film 12 and the second light shielding film 22 from the base materials 11 and 21 by ultrasonic cleaning or the like does not occur.

In addition, since the adhesive layer 30 is exposed from between the first light shielding film 12 and the second light shielding film 22, moisture absorbed by the adhesive layer 30 under a high-temperature and high-humidity environment or the like can be released. Therefore, it is possible to avoid a situation in which moisture becomes supersaturated in the adhesive layer 30 and dew condensation occurs at the interfaces between the adhesive layer 30 and the first optical element 10 and the second optical element 20 to cause whitening, and it is possible to realize good optical performance.

In addition, in the cemented lens 50 according to the present embodiment, the adhesive layer 30 is exposed on the surface 12a (FIG. 4) of the first light shielding film 12 formed in the non-optical effective region 11c of the base material 11 of the first optical element 10 and on the surface 22a (FIG. 4) of the second light shielding film 22 formed in the non-optical effective region 21c of the base material 21 of the second optical element 20. As a result, a state in which the adhesive layer 30 is relatively widely exposed can be realized, so that the above-described release of moisture can be efficiently performed.

In addition, in the cemented lens 50 according to the present embodiment, antireflection coating (not illustrated) may be formed in the optical effective region 11a of the base material 11 of the first optical element 10. The antireflection coating can be made of the same transparent material as a base layer 13a according to a later described second embodiment.

In addition, in the cemented lens 50 according to the present embodiment, antireflection coating (not illustrated) may also be formed in the optical effective region 21b of the base material 21 of the second optical element 20. The antireflection coating can be made of the same transparent material as the base layer 23b according to the later described second embodiment.

Note that the antireflection coating (not illustrated) may also be formed in the optical effective region 11b of the base material 11 of the first optical element 10 and the optical effective region 21a of the base material 21 of the second optical element 20, but it is not necessary to provide the antireflection coating when the bonding resin of the adhesive layer 30 and the base materials 11 and 21 are close in refractive index. In a case where the antireflection coating is also provided in the optical effective region 11b and the optical effective region 21a, antireflection coating made of the same transparent material as the base layers 13a and 23b according to the later described second embodiment can be formed.

Modification Example

In the above-described embodiment, the adhesive layer 30 is exposed on the surface 12a of the first light shielding film 12 and the surface 22a of the second light shielding film 22 (FIG. 4). However, the present invention is not limited thereto, and the adhesive layer 30 may be exposed from between the first light shielding film 12 and the second light shielding film 22. For example, a configuration of a modification example illustrated in FIG. 7 may be used.

Figure 7:
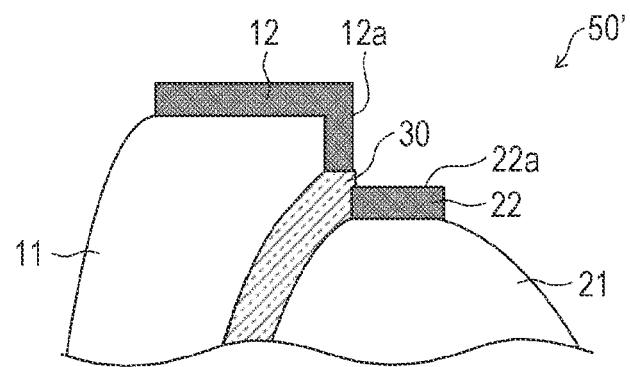
FIG. 7 is an enlarged partial view illustrating a modification example of an aspect illustrated in FIG. 2.

The aspect of FIG. 7 is different from the aspect of FIG. 4 in that the adhesive layer 30 is not exposed on the surface 12a of the first light shielding film 12 and the surface 22a of the second light shielding film 22. Even in the aspect of FIG. 7, since the adhesive layer 30 has the exposed portion that is not covered with the light shielding film, it is possible to realize a cemented lens that has the same function and effect as those of the adhesive layer 30 according to the first embodiment and prevents occurrence of an optical defect of the cemented lens caused by the light shielding film.

Note that the aspect of the adhesive layer 30 illustrated in FIG. 7 and the aspect of the adhesive layer 30 illustrated in FIG. 4 are determined by, for example, a difference in the application amount of the adhesive constituting the adhesive layer 30. In addition, as illustrated in FIG. 4, after the adhesive layer 30 is exposed on the surface 12a of the first light shielding film 12 and the surface 22a of the second light shielding film 22, a step of wiping off portions exposed on the surface 12a and the surface 22a is included, whereby the aspect of FIG. 7 is obtained.

Second Embodiment

Another embodiment of the present invention will be described below. For convenience of description, components having the same functions as the components described in the above embodiment are denoted by the same reference numerals, and the description thereof will not be repeated.

1. Cemented Lens

Figure 8:
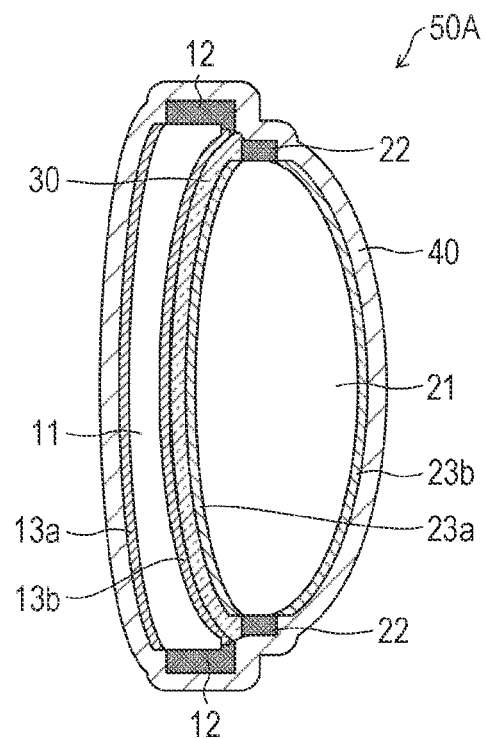
FIG. 8 is a cross-sectional view illustrating a configuration of a cemented lens according to another embodiment of the present invention.

FIG. 8 is a cross-sectional view of a cemented lens 50A according to the present embodiment. The cemented lens 50A is different from the cemented lens 50 according to the first embodiment described above in that the layer configuration laminated on each of base materials 11 and 21 of a first optical element 10A and a second optical element 20A is different from the layer configuration laminated on each of the base materials 11 and 21 of the cemented lens. Furthermore, the cemented lens 50A according to the present embodiment is different from the cemented lens 50 according to the first embodiment described above in that the cemented lens 50A is covered with a low refractive index layer 40.

(1) First Optical Element 10A

Figure 9:
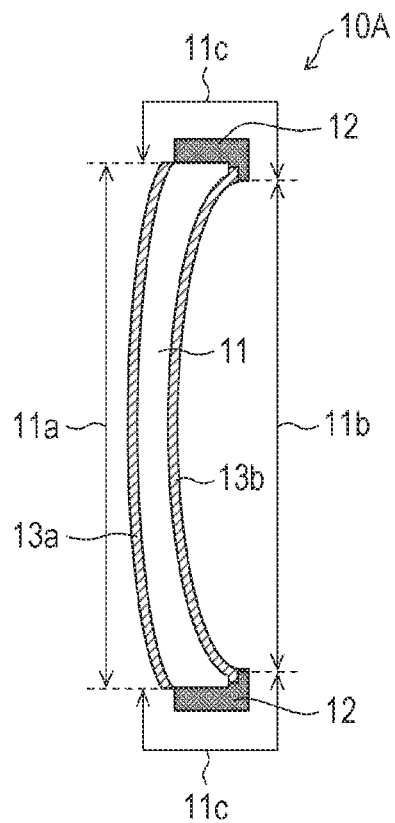
FIG. 9 is a cross-sectional view illustrating a configuration of a first optical element of the cemented lens illustrated in FIG. 8.

FIG. 9 is a cross-sectional view of a first optical element 10A. The first optical element 10A according to the present embodiment is different from the first optical element 10 according to the first embodiment in that a base layer 13a is formed in an optical effective region 11a of a base material 11. Note that, in a case where antireflection coating is formed in the optical effective region 11a of the base material 11 of the first optical element 10 according to the first embodiment described above, the base layer 13a is formed as a substitute for the antireflection coating in the first optical element 10A according to the present embodiment.

In the optical effective region 11b of the base material 11, the base layer 13b as a bonding surface antireflection coating may be formed. As the bonding surface antireflection coating, a transparent material used in the base layer 13a described below can be used.

<Base Layer 13a>

The base layer 13a functions as the antireflection coating. Hereinafter, the layer configuration and the material of the base layer 13a will be described.

(a) Layer Configuration

The base layer 13a may be a single layer film or a multilayer film in which one or more thin films (hereinafter, a sublayer) each made of a transparent material having a refractive index of 1.35 to 2.5 are laminated. Here, the sublayer refers to a physical single thin film constituting the base layer 13a. For example, when the base layer 13a has a configuration in which at least one or more sublayers are laminated, and each sublayer functions as an optical interference layer, the reflectivity of the antireflection coating can be extremely lowered.

Even when the base layer 13a is a single layer film or a multilayer film, the optical design (design of refractive index and optical film thickness) of each layer can be performed by the matrix method as in the case of designing a normal antireflection coating. By increasing the number of laminated sublayers constituting the base layer 13a, antireflection coating having higher antireflection performance can be obtained.

(b) Transparent Material

The transparent material constituting each sublayer of the base layer 13a can be one or more of a transparent inorganic material having a refractive index of 1.35 to 2.5, an organosilane, and an organic resin.

Examples of the transparent inorganic material include an inorganic oxide and an inorganic fluoride.

Examples of the inorganic oxide include $Al_2O_3$, $ZrO_2+Al_2O_3$, $SiO$, $MgO$, $La_2O_3+Al_2O_3$, $Y_2O_3$, $In_2O_3+SnO_2$, $La_2Ti_2O_7$, $SnO_2$, $Ta_2O_5$, $HfO_2$, $ZrO_2$, $CeO_2$, $WO_3$, $ZrO_2+TiO_2$, $Ta_2O_5$, $Ta_2O_5+ZrO_2$, $Ta_2O_5+TiO_2$, $Ti_3O_5$, $Ti_4O_7$, $TiPr_6O_{11}+TiO_2$, $TiO$, $TiO_2$, $Nb_2O_5$, $TiO_2+La_2O_3$, $Pr_6O_{11}+TiO_2$, $SiO_2$, $SiO_xN_y$, and $CeO_2$.

Examples of the inorganic fluoride include $MgF_2$, $AlF_3$, $Na_2SiF_6$, $H_2SiF_6$, $NaF$, $CaF_2$, $Na_3AlF_6$, and $YF_3$.

Furthermore, as the transparent inorganic material, SiN, SiC, ZnS, or the like can be used in addition to the inorganic oxide and the inorganic fluoride.

Next, examples of the organosilane include straight silicones such as dimethyl silicone, methyl phenyl silicone, and methyl hydrogen silicone. In addition to these straight silicones, various modified silicones may be used as the organosilane. As the modified silicone, for example, a modified silicone in which a functional group such as a polyether-modified silicone, an epoxy-modified silicone, an amino-modified silicone, a carboxy-modified silicone, a mercapto-modified silicone, a carbino-modified silicone, a methacryl-modified silicone, or a long-chain alkyl-modified silicone is modified at one terminal, both terminals, or side chains can be used. Furthermore, those obtained by polymerizing these straight silicones and/or modified silicones by appropriately combining the straight silicones and/or the modified silicones can also be used.

Examples of the organic resin include epoxy resins, fluororesins, silicone resins, polyethylene resins, polypropylene resins, polyvinyl chloride resins, polyvinylidene chloride resins, polystyrene resins, polyvinyl acetate resins, acrylic resins, polyamide resins, polyacetal resins, polycarbonate resins, modified polyphenylene ether resins, polybutylene terephthalate resins, polyethylene terephthalate resins, cyclic polyolefin resins, liquid crystal polymers, and the like, or monomer compounds thereof.

However, when the base layer 13a is a multilayer film, the sublayer disposed on the outermost surface of the base layer is preferably any one of an inorganic oxide, an inorganic fluoride, an organosilane, and an organic resin. This is because in a case where the outermost layer of the base layer 13a is made of any one of these materials, adhesion between the first light shielding film 12 and the base layer 13a is improved when the first light shielding film is laminated on the surface of the base layer 13a or when a later described low refractive index layer 40 is laminated on the surface of the base layer 13a.

(c) Film Thickness

In order to obtain antireflection coating having a wider bandwidth and lower reflection, the optical film thickness of each sublayer is preferably 150 nm or less. A case where the optical film thickness of each sublayer exceeds 150 nm is not preferable since the design includes many unnecessary ripples and the average reflectivity of the antireflection coating cannot be kept low.

(d) Film Forming Method

When the base layer 13a (each sublayer) is formed, it is preferable to employ a vacuum film formation method or a wet film formation method. As the vacuum film formation method, both a physical vapor deposition method and a chemical vapor deposition method can be suitably used. Examples of the physical vapor deposition method include a vacuum vapor deposition method, a sputtering method, an ion plating method, and an ion beam vapor deposition method. Examples of the chemical vapor deposition method include a CVD method (including a plasma CVD method)

and an atomic layer deposition method (ALD method). Among them, a vacuum vapor deposition method, a sputtering method, and a CVD method can be particularly suitably employed. Examples of the wet film formation method include a dip coating method, a spin coating method, a spray coating method, a roll coating method, a screen printing method, and the like. By adopting these methods, the base layer 13a (or sublayer) having a physical film thickness in the range of 1 nm or more and 150 nm or less can be formed with high accuracy.

<First Light Shielding Film 12>

The first light shielding film 12 are formed in the non-optical effective region 11c of the base material 11 similarly to the first light shielding film 12 according to the first embodiment. According to the present embodiment, the base layers 13b formed in the above-described optical effective region 11b of the base material 11 is also slightly formed in the non-optical effective region 11c (FIG. 9). Therefore, in the non-optical effective region 11c of the base material 11, the first light shielding film 12 are provided on the slightly formed surface of the base layer 13b and the surface of the base material 11. Furthermore, the light shielding film 12 may be slightly formed on the surface of the base layer 13a.

(2) Second Optical Element 20A

Figure 10:
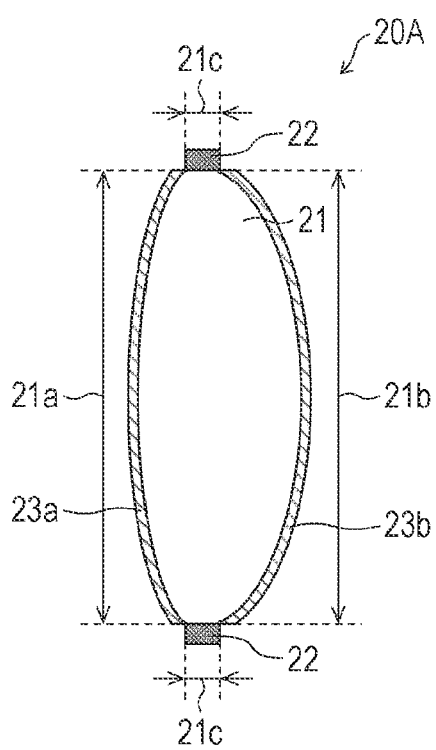
FIG. 10 is a cross-sectional view illustrating a configuration of a second optical element of the cemented lens illustrated in FIG. 8.

FIG. 10 is a cross-sectional view of the second optical element 20A. The second optical element 20A according to the present embodiment is different from the second optical element 20 according to the first embodiment in that a base layer 23b is formed in an optical effective region 21b of a base material 21. Note that, in a case where antireflection coating is formed in the optical effective region 21b of the base material 21 of the second optical element 20 according to the first embodiment described above, the base layer 23b is formed as a substitute for the antireflection coating in the second optical element 20A according to the present embodiment.

<Base Layer 23b>

The base layer 23b functions as antireflection coating similarly to the base layer 13a. Details of the base layer 23b are the same as the details of the base layer 13a described above. The base layer 23b may be made of the same material as the base layer 13a, or may be made of a different material.

In the second optical element 20A of the present embodiment, the base layer 23a may be formed in the optical effective region 21a of the base material 21. The base layer 23a is a bonding surface antireflection coating similar to the base layer 13b provided in the optical effective region 11b of the base material 11. However, when the refractive index of the base material 21 is a value close to the refractive index of the adhesive used for the adhesive layer 30 and the reflectivity at these interfaces is sufficiently small, the base layer 23a is unnecessary.

<Second Light Shielding Film 22>

Similarly to the second light shielding film 22 according to the first embodiment, the second light shielding film 22 is formed in the non-optical effective region 21c of the base material 21. Furthermore, the light shielding film 22 may be slightly formed on the surfaces of the base layer 23a and the base layer 23b.

(3) Adhesive Layer 30

As Illustrated in FIG. 8, in the Cemented Lens 50 according to the present embodiment, the first optical element 10A and the second optical element 20A described above are bonded to each other with an adhesive layer 30 interposed therebetween. Also in the present embodiment, as in the first embodiment, the adhesive layer 30 is exposed from between the first light shielding film 12 and the second light shielding film 22.

(4) Low Refractive Index Layer 40

The low refractive index layer 40 covers the entire surface of the configuration in which the first optical element 10A and the second optical element 20A are bonded by the adhesive layer 30. In other words, as illustrated in FIG. 8, the low refractive index layer 40 covers the surface of the base layer 13a, the surface of the first light shielding film 12, the exposed surface of the adhesive layer 30, the surface of the second light shielding film 22, and the surface of the base layer 23b.

The low refractive index layer 40 is a layer having a refractive index of 1.15 to 1.35, and functions as antireflection coating that suppresses reflection of incident light due to an optical interference action. Therefore, since the low refractive index layer 40 is laminated with the base layers 13a and 23b formed in the optical effective regions of the base materials 11 and 21, the reflectivity of the antireflection coating can be maintained low even when light in a wide wavelength range is incident. Furthermore, since the low refractive index layer 40 is laminated on the first light shielding film 12 and the second light shielding film 22, the reflectivity of the antireflection coating can be maintained low.

The low refractive index layer 40 can be, for example, a layer in which a low refractive index material having voids in particles such as hollow silica particles and porous silica (nanoporous silica) is bound by a binder, or a layer made of a material such as a group consisting of $SiO_2$, $MgF_2$, and $Al_2O_3$ having a refractive index within the above range. According the present embodiment, in particular, the low refractive index layer 40 is preferably a hollow silica layer in which hollow silica particles 401 are bound to each other by a binder 402 (binding material) as schematically exemplified in FIG. 11. Hereinafter, the configuration of the low refractive index layer 40 will be specifically described assuming that the low refractive index layer 40 is a hollow silica layer.

(a) Hollow Silica Particles 401

Figure 11:
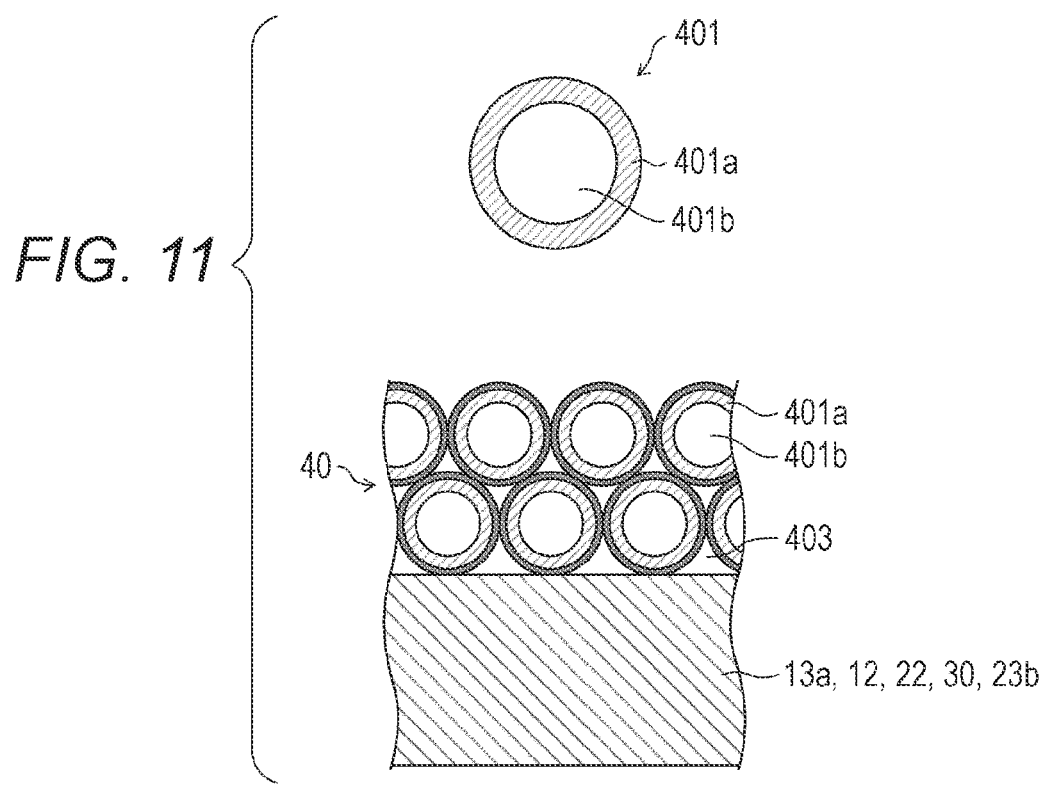
FIG. 11 is a cross-sectional view illustrating a configuration of a low refractive index layer of the cemented lens illustrated in FIG. 8.

First, the hollow silica particles 401 will be described. In the present invention, the hollow silica particles 401 refer to silica primary particles having a core-shell structure (balloon structure) including a hollow portion in an outer shell made of silica. In addition, the primary particles refer to those in which the silica particles are not aggregated with other particles. Specifically, as schematically illustrated in FIG. 11, the silica particle includes an outer shell portion 401a made of silica and a hollow portion 401b whose periphery is completely surrounded by the outer shell portion 401a. By adopting the hollow silica particles 401 having the core-shell structure as a main material as a layer configuration material of the low refractive index layer 40, the refractive index of the low refractive index layer 40 can be reduced to be lower than the refractive index (1.48) of silica itself. In addition, as compared with a porous silica layer or the like composed of an aggregate of the porous silica having a large number of pores in the silica particles, in the present embodiment, since hollow silica in which the hollow portion 401b is completely surrounded by the outer shell portion 401a is used, a membrane having high strength of the silica particles themselves and excellent durability can be obtained. Furthermore, since a liquid or the like does not enter inside the hollow silica particles 401, there is no possibility that the hollow portion 401b inside the silica is filled with the resin material or the like even when a film is formed by a wet film formation method, and the void ratio of the material itself can be maintained to prevent an increase in the refractive index.

The average particle diameter $D_{50}$ of the hollow silica particles 401 is preferably 5 nm or more and 100 nm or less. When the average particle diameter $D_{50}$ of the hollow silica particles 401 is less than 5 nm, it is difficult to provide a void portion 403 other than the hollow portion 401b of the hollow silica particles 401 in the low refractive index layer 40. On the other hand, when the average particle diameter Ds, of the hollow silica particles 401 exceeds 100 nm, light scattering (haze) may occur, which is not preferable. Furthermore, when the average particle diameter $D_{50}$ of the hollow silica particles 401 exceeds 100 nm, it is extremely difficult to precisely control the physical film thickness of the low refractive index layer 40 in units of several nm.

(b) Binder 402

Next, the binder 402 will be described. As illustrated in FIG. 11, in the low refractive index layer 40, the hollow silica particles 401 are bound to each other by the binder 402 to form a layer. At this time, it is preferable that the outer surface of the hollow silica particles 401 is covered with the binder 402, and the hollow silica particles 401 are bound to each other by the binder 402 covering the outer surface of the hollow silica particles 401.

As the binder 402, a resin material or a metal alkoxide can be employed. Examples of the resin material include epoxy resins, fluororesins, silicone resins, polyethylene resins, polypropylene resins, polyvinyl chloride resins, polyvinylidene chloride resins, polystyrene resins, polyvinyl acetate resins, acrylic resins, polyamide resins, polyacetal resins, polycarbonate resins, modified polyphenylene ether resins, polybutylene terephthalate resins, polyethylene terephthalate resins, cyclic polyolefin resins, liquid crystal polymers, and the like, or monomer compounds thereof. These resin materials are preferably ultraviolet curable, normal temperature curable, or thermosetting compounds, and particularly preferably ultraviolet curable or normal temperature curable compounds. As a specific layer forming method, for example, a wet method such as a dip coating method, a spin coating method, a spray method, a roll coating method, a screen printing method, and the like can be employed in which the above materials and the hollow silica particles 401 are mixed, a polymerization initiator, a crosslinking agent, or the like is added as necessary, and the mixture is diluted to an appropriate concentration with a solvent or the like to prepare a coating liquid. By these methods, a coating liquid is applied to the surface of the layers (base layer 13a, first light shielding film 12, second light shielding film 22, adhesive layer 30, base layer 23b) on which the low refractive index layer 40 is laminated so as to have an appropriate thickness, and then polymerized and crosslinked by ultraviolet irradiation, heat treatment, or the like to volatilize the solvent, whereby the low refractive index layer 40 can be formed.

In addition, the material is preferably a material in which a metal alkoxide is dissolved or suspended in a solvent to form a sol, and a gel is generated by hydrolysis and polymerization, and for example, a material in which silica gel is generated by hydrolysis and polymerization, such as alkoxysilane or silsesquioxane, is preferably used. These materials and the hollow silica particles 401 are dissolved or suspended in a solvent to prepare a sol-gel agent, the sol-gel agent is applied to the surface of the layers (base layer 13a, first light shielding film 12, second light shielding film 22, adhesive layer 30, base layer 23b) on which the low refractive index layer 40 is laminated by a spray coating method, a spin coating method, a dip coating method, a flow coating method, a bar coating method, or the like, a gel containing the hollow silica particles 401 is formed by hydrolysis, and the solvent is volatilized, whereby the low refractive index layer 40 can be formed.

The volatilization of the solvent may be performed by natural drying by being left at normal temperature, or may be performed by heating and drying using a dryer, a hot plate, an electric furnace, or the like. The drying conditions are a temperature and time at which the organic solvent in the low refractive index layer 40 can be evaporated to some extent without affecting the lens. When the adhesive layer 30 is cured in order to bond the first optical element 10 and the optical element 20, which constitute the cemented lens 50, via the adhesive layer 30, stress due to curing shrinkage remains in the resin of the adhesive layer 30, and the stress in the resin is released due to the influence of heat during drying, so that surface deformation may occur. Therefore, it is preferable to perform drying at room temperature or the like of 100° C. or lower, more preferably 80° C. or lower, and still more preferably 40° C. or lower as a drying temperature.

(c) Void Portion 403

In the present embodiment, in the low refractive index layer 40, as illustrated in FIG. 11, void portions 403 are preferably provided between the silica particles 401 bound to each other. By providing the hollow portion 401b existing inside the hollow silica particles 401 and the void portions 403 surrounded by the binder 402 between the hollow silica particles 401 in the low refractive index layer 40, the void ratio in the low refractive index layer 40 can be increased, the refractive index of the low refractive index layer 40 can be made lower than the refractive index of silica itself, and a layer having higher antireflection performance can be obtained. In addition, as in the present embodiment, even when the void portions 403 are not filled with a binder or the like, by binding the hollow silica particles 401 to each other with the binder 402 covering the outer surface of the hollow silica particles 401 interposed therebetween, the adhesion between the hollow silica particles 401 can be improved, and the adhesion between each hollow silica particle 401 and the layers (base layer 13a, first light shielding film 12, second light shielding film 22, adhesive layer 30, base layer 23b) on which the low refractive index layer 40 is laminated can be improved. In addition, since the hollow silica particles 401 themselves are surrounded by the outer shell portion 401a made of silica, a layer having excellent scratch resistance and durability can be obtained without covering the outer surface of the low refractive index layer 40 with a resin or the like.

(d) Volume Ratio of Hollow Silica Particles 401 and Binder 402

Here, in the low refractive index layer 40, the volume occupied by the hollow silica particles 401 and the binder 402 in the layer is preferably 30 volume percentage or more and 99 volume percentage or less. The volume occupied by the hollow silica particles 401 here means the total volume of the hollow silica sphere including the outer shell portion 401a of the hollow silica particles 401 and the hollow portion 401b surrounded by the hollow portion 401b in the low refractive index layer 40. When the volume occupied by the hollow silica particles 401 and the binder 402 in the low refractive index layer 40 is less than 30 volume percentage, durability and scratch resistance of the low refractive index layer 40 are deteriorated, which is not preferable. On the other hand, when the volume occupied by the hollow silica particles 401 in the low refractive index layer 40 exceeds 99 volume percentage, the volume occupied by the hollow silica particles 401 in the low refractive index layer 40 is more preferably 90 volume percentage or less from the viewpoint that the volume of the void portion 403 in the low refractive index layer decreases and the refractive index of the low refractive index layer 40 does not reach desired characteristics.

(e) Refractive Index

The refractive index of the low refractive index layer 40 is required to be 1.15 or more and 1.35 or less as described above. In a case where the refractive index of the low refractive index layer 40 is less than 1.15, with the low refractive index layer 40 including a hollow silica layer, the void ratio in the layer becomes too high, and the durability or the like of the low refractive index layer 40 is deteriorated, which is not preferable. From this viewpoint, the refractive index of the low refractive index layer 40 is more preferably 1.17 or more. On the other hand, when the refractive index of the low refractive index layer 40 exceeds 1.35, the reflectivity at the design center wavelength becomes high, which is not preferable. Therefore, from this viewpoint, the refractive index of the low refractive index layer 40 is preferably low within the above range, more preferably 1.32 or less, and still more preferably 1.30 or less.

(f) Film Thickness

A physical film thickness of the low refractive index layer 40 is preferably in a range of 80 nm or more and 240 nm or less. When the physical film thickness of the low refractive index layer 40 is less than 80 nm or exceeds 240 nm, it is difficult to set the phase change to an appropriate value for light having wavelengths in the visible light range and the near-infrared range, and the antireflection performance of the low refractive index layer 40 may be deteriorated, which is not preferable.

2. Operation and Effect of Present Embodiment

According to the configuration of the present embodiment, in addition to the operational effects achieved by the configuration according to the first embodiment described above, by forming the low refractive index layer 40 on the adhesive layer 30, reflection of light incident on the surface of the adhesive layer 30 exposed from between the first light shielding film 12 and the second light shielding film 22 can be reduced. This reduction in reflection will be described with reference to FIG. 12.

Figure 12:
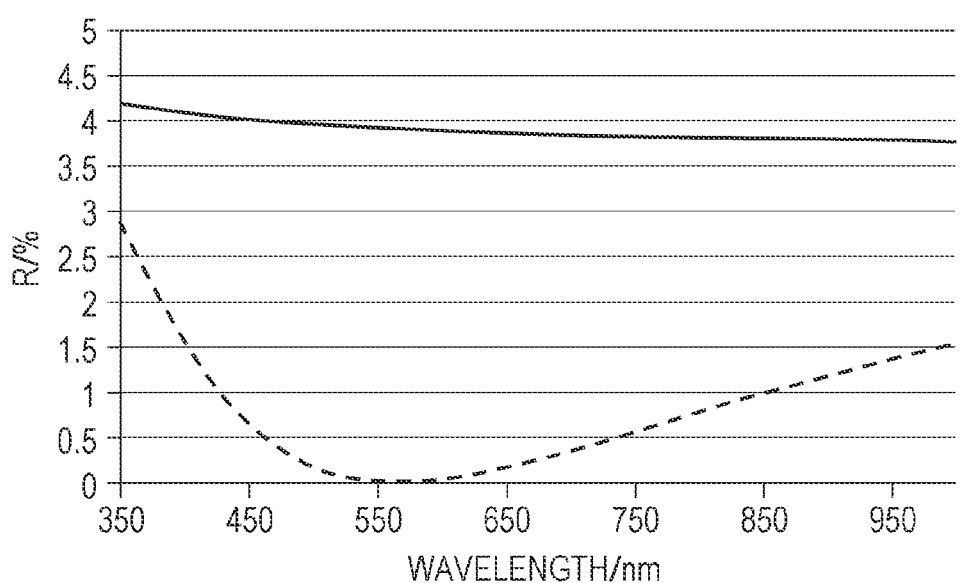
FIG. 12 is a graph illustrating a reflection reduction effect of the cemented lens illustrated in FIG. 1 and the cemented lens illustrated in FIG. 8.

FIG. 12 illustrates the reflectivity of light when light is incident on the surface of the adhesive layer 30 exposed from between the first light shielding film 12 and the second light shielding film 22, in cases of using the cemented lens 50A according to the present embodiment and the cemented lens 50 (FIG. 1) according to the first embodiment. In FIG. 12, the reflectivity data of the cemented lens 50 according to the first embodiment is indicated by a solid line, and the reflectivity data of the cemented lens 50A according to the second embodiment is indicated by a broken line.

As illustrated in FIG. 12, it can be seen that the cemented lens 50A according to the present embodiment effectively reduces the reflectivity of light when light is incident on the surface of the adhesive layer 30 exposed from between the first light shielding film 12 and the second light shielding film 22.

Note that the low refractive index layer 40 has the above-described effect as long as it covers at least the adhesive layer 30. However, by forming the low refractive index layer 40 not only on the adhesive layer 30 but also on the base layers 13a and 23b, the first light shielding film 12, and the second light shielding film 22, the reflectivity of the antireflection coating can be maintained low even when light in a wide wavelength range is incident.

Note that the cemented lens 50A of the present embodiment may include layers other than the layers described above. For example, a functional layer may be provided on the surface of the low refractive index layer 40. The functional layer is a transparent and extremely thin film that does not optically affect the antireflection performance of the low refractive index layer 40, and refers to a layer having various functions. Examples of such a functional layer include a layer having various functions such as improvement in hardness, scratch resistance, heat resistance, weather resistance, solvent resistance, water repellency, oil repellency, antifogging properties, hydrophilicity, antifouling properties, and electrical conductivity of the surface of the low refractive index layer 40.

Furthermore, as another layer, an adhesion layer for improving adhesion between the first light shielding film 12 and the second light shielding film 22 and the low refractive index layer 40 can be provided.

The present invention is not limited to the above-described embodiments, and various modifications can be made within the scope indicated in the claims, and embodiments obtained by appropriately combining technical means disclosed in different embodiments are also included in the technical scope of the present invention.

CONCLUSION

In order to solve the above problems, a cemented lens 50, 50', 50A according to an aspect of the present invention is a cemented lens 50, 50', 50A including: a first optical element 10 in which a first light shielding film 12 is formed in a non-optical effective region 11c of a base material 11; a second optical element 20 in which a second light shielding film 22 is formed in a non-optical effective region 12c of a base material 12; and an adhesive layer 30 that bonds an optical effective region of the first optical element 10 and an optical effective region of the second optical element 20 to each other, in which the adhesive layer 30 is exposed from between the first light shielding film and the second light shielding film.

According to the above configuration, it is possible to provide a technique for preventing occurrence of an optical defect of the cemented lens caused by the light shielding film.

Specifically, the adhesive layer 30 has a portion (exposed portion) exposed from between the first light shielding film 12 and the second light shielding film 22 and not covered with any of the first light shielding film 12 and the second light shielding film 22. In other words, before the adhesive layer 30 is formed, the first light shielding film 12 and the second light shielding film 22 (hereinafter, simply referred to as a light-shielding film) are formed in the respective optical elements. That is, when the light shielding films (the first light shielding film 12 and the second light shielding film 22) are formed in the non-optical effective regions 11c and 21c, it is not necessary to thermally cure the light shielding films (the first light shielding film 12 and the second light shielding film 22) at a low temperature in consideration of the adhesive layer 30, and the light shielding films can be thermally cured at a high temperature. Therefore, the solvents of the first light shielding film 12 and the second light shielding film 22 can be sufficiently volatilized. As a result, the solvent does not infiltrate the adhesive layer 30 formed between the optical elements 10 and 20. Therefore, degradation (discoloration) of the adhesive layer that may occur with infiltration does not occur, and deterioration of optical performance and function does not occur.

In addition, since the first light shielding film 12 and the second light shielding film 22 can be sufficiently cured, even if the cemented lens 50 is cleaned with a cleaning liquid such as isopropyl alcohol, dyes contained in the first light shielding film 12 and the second light shielding film 22 are not eluted into the cleaning liquid, and performance degradation as the first light shielding film 12 and the second light shielding film 22 does not occur. In addition, since the first light shielding film 12 and the second light shielding film 22 can be sufficiently cured, adhesion between the first light shielding film 12 and the second light shielding film 22 and the base materials 11 and 21 of the optical element can be secured. Therefore, peeling of the first light shielding film 12 and the second light shielding film 22 from the base materials 11 and 21 by ultrasonic cleaning or the like does not occur.

In addition, since the adhesive layer 30 is exposed from between the first light shielding film 12 and the second light shielding film 22, moisture absorbed by the adhesive layer 30 under a high-temperature and high-humidity environment or the like can be released. Therefore, it is possible to avoid a situation in which moisture becomes supersaturated in the adhesive layer 30 and dew condensation occurs at the interfaces between the adhesive layer 30 and the first optical element 10 and the second optical element 20 to cause whitening, and it is possible to realize good optical performance.

In the cemented lenses 50, 50', and 50A, the adhesive layer is exposed on a surface of the first light shielding film formed in the non-optical effective region of the first optical element and on a surface of the second light shielding film formed in the non-optical effective region of the second optical element.

According to the above configuration, it is possible to realize a state in which the adhesive layer extends also on the surface of the light shielding film and is relatively widely exposed. As a result, a state in which the adhesive layer 30 is relatively widely exposed can be realized, so that the above-described release of moisture can be efficiently performed.

In the cemented lens 50A, at least one selected from the groups consisting of (i) an optical effective region (optical effective region 11a, 21b) of the cemented lens, (ii) the first light shielding film 12 and the second light shielding film 22, and (iii) the exposed portion of the adhesive layer 30 is covered with a low refractive index layer 40 having a refractive index of 1.15 to 1.35.

According to the above configuration, the low refractive index layer 40 functions as antireflection coating that suppresses reflection of incident light due to optical interference action. Therefore, the light transmittance of the cemented lens can be improved, and the cemented lens 50A having high optical performance can be realized.

In addition, there is a case where a part of light incident on the first light shielding film 12 and the second light shielding film 22 is reflected and becomes harmful light, but reflection can be prevented by covering the light shielding films 12 and 22 with the low refractive index layer 40.

In addition, light incident on the exposed portion of the adhesive layer 30 may be reflected and become harmful light, but reflection can be prevented by covering the portion with the low refractive index layer 40.

In the cemented lens 50A, the low refractive index layer 40 is selected from the groups consisting of $SiO_2$, $MgF_2$, and $Al_2O_3$.

According to the above configuration, the low refractive index layer 40 can be firmly adhered to the lower layer.

Further, in the cemented lens 50A, the low refractive index layer 40 is a layer in which hollow silica particles 401 having a balloon structure including an outer shell portion made of silica and a hollow portion surrounded by the outer shell portion are bound by a binder 402 and there are void portions other than the hollow portion of the hollow silica particles, and the average particle diameter of the hollow silica particles is 5 nm or more and 100 nm or less.

According to the above configuration, by adopting hollow silica particles having a hollow portion as a main component as a constituent component of the low refractive index layer, the refractive index of the low refractive index layer 40 can be reduced to be lower than the refractive index (1.48) of silica itself.

In addition, by forming the layer in which the hollow silica particles 401 whose periphery is completely surrounded by the outer shell portion are bound by the binder 402, the low refractive index layer 40 can be firmly adhered to the layer below the layer. This can contribute to realization of antireflection coating (low refractive index layer 40) excellent in scratch resistance and durability.

In the cemented lens 50A, the low refractive index layer 40 is a layer formed using the hollow silica particles 401 and a resin material or a metal alkoxide as a component of the binder 402.

According to the above configuration, it is possible to form the low refractive index layer without performing heat treatment. Therefore, it is possible to prevent thermal expansion and deformation of the base material of the first and second optical elements and to realize the preferable cemented lens 50A.

Further, the base layers 13a and 23b in which one or more thin films made of a transparent material having a refractive index of 1.35 to 2.5 are laminated are provided in optical effective regions (optical effective region 11a, 21b) of the cemented lens, and the low refractive index layer is laminated on the base layer.

According to the above configuration, since the base layers 13a and 23b are provided, antireflection performance can be enhanced as compared with a configuration in which the low refractive index layer is provided without providing the base layer, and generation of harmful light (stray light) that causes ghost and flare can be suppressed.

Further, in the cemented lens 50A, the base layers 13a and 23b are films manufactured by a vacuum vapor deposition method, a sputtering method, or an ALD method.

According to the above configuration, it is possible to provide the cemented lens in which the base layers 13a and 23b are formed with high accuracy.

In order to solve the above problem, an optical system (zoom lens 500) according to an aspect of the present invention includes the cemented lens 50.

According to the above configuration, since the cemented lens which suppresses the degradation of the optical performance and has the resistance to the cleaning process and the resistance to the environmental change is provided, the optical system (zoom lens 500) having the preferable optical performance can be provided.

In order to solve the above problems, an optical device (imaging device 600) according to an aspect of the present invention includes the cemented lenses 50, 50', and 50A, and a light receiving element (image sensor 603) that receives light condensed by the cemented lens.

According to the above configuration, since it is possible to use the light condensed by the cemented lens that suppresses the degradation of the optical performance and has the resistance to the cleaning process and the resistance to the environmental change, it is possible to realize the optical device (imaging device 600) having the preferable optical performance.

In order to solve the above problems, a method of manufacturing a cemented lens according to an aspect of the present invention includes bonding an optical effective region of a first optical element in which a first light shielding film is formed in a non-optical effective region of a base material and an optical effective region of a second optical element in which a second light shielding film is formed in a non-optical effective region of a base material to each other with an adhesive layer interposed therebetween.

According to the above configuration, similarly to the cemented lens of one aspect of the present invention, it is possible to provide a technique of preventing occurrence of an optical defect of the cemented lens caused by the light shielding film.

EXAMPLES

First Example

An example of the present invention will be described below.

The cemented lens 50 illustrated in FIG. 1 was manufactured. As the base material 11, S-NBM51 manufactured by OHARA INC. and having a refractive index at d line (wavelength 587.56 nm) (hereinafter, referred to as nd) of 1.613 was used. As the base material 21, S-FPL51 manufactured by OHARA INC. with nd of 1.497 was used.

Next, a dielectric multilayer film including an $Al_2O_3$ layer, a $ZrO_2+TiO_2$ layer, and an $MgF_2$ layer was formed as antireflection coating, in the optical effective region 11a of the base material 11. The film thickness of each layer is shown in Table 1. Also in the optical effective region 21b of the base material 21, a dielectric multilayer film including an $Al_2O_3$ layer, a $ZrO_2+TiO_2$ layer, and an $MgF_2$ layer was formed as antireflection coating. The film thickness of each layer is shown in Table 1. In addition, a dielectric multilayer film including a $SiO_2$ layer and an $Al_2O_3$ layer was formed as antireflection coating in the optical effective region 11b of the base material 11. The film thickness of each layer is shown in Table 2. On the other hand, no film was particularly formed in the optical effective region 21a of the base material 21. This is because the refractive index of the base material 21 is close to the refractive index of the adhesive used for bonding, and the reflectivity at the interface is sufficiently small. Each antireflection coating was formed by a vacuum vapor deposition method.

Furthermore, a light shielding coating material GT-7II manufactured by Canon Chemicals Inc. was applied to the non-optical effective region 11c of the base material 11 so as to have a thickness of 5 to 10 μm at the end surface of the base material, and dried and cured at 200° C. for one hour to form a first light shielding film 12 (black coating film). In this manner, first optical element 10 was obtained.

Similarly, a light shielding coating material GT-7II manufactured by Canon Chemicals Inc. was applied to the non-optical effective region 21c of the base material 21 so as to have a thickness of 5 to 10 μm at the end surface of the base material, and dried and cured at 200° C. for one hour to form a second light shielding film 22 (black coating film). In this manner, second optical element 20 was obtained.

Subsequently, the surface of the first optical element 10 on the optical effective region 11b side and the surface of the second optical element 20 on the optical effective region 21a side were bonded by the adhesive layer 30 to form the cemented lens 50. Specifically, an adhesive was applied to the optical effective region 11b in a state where the optical effective region 11a of the base material 11 was disposed downward, the base material 21 was disposed at an appropriate position using an optical axis adjustment device while the adhesive was pressed as being sandwiched between the optical effective region 11b of the base material 11 and the optical effective region 21a of the base material 21, and the adhesive layer 30 was cured by irradiation with UV light. For the adhesive layer 30, a polyene-polythiol adhesive OP-1080L (manufactured by Denka Company Limited) was used. The refractive index of OP-1080L after UV curing, that is, the refractive index of the adhesive layer 30 is 1.52. The thickness of the adhesive layer 30 was made about 10 μm. As described above, the cemented lens 50 of the mode illustrated in FIG. 1 was manufactured as the first example.

TABLE 1

| | | Materials | Refractive index | | Optical effective region 11a, First example | Optical effective region 21b, First example |
|---|---|---|---|---|---|---|
| Outermost layer | 7th layer | $MgF_2$ | 1.38 | Physical film thickness (nm) | 96.1 | 100.5 |
| Base layer | 6th layer | $ZrO_2 + TiO_2$ | 2.10 | | 32.0 | 25.2 |
| | 5th layer | $AL_2O_3$ | 1.63 | | 20.3 | 26.0 |
| | 4th layer | $ZrO_2 + TiO_2$ | 2.10 | | 52.5 | 18.0 |
| | 3rd layer | $AL_2O_3$ | 1.63 | | 28.5 | 17.7 |
| | 2nd layer | $ZrO_2 + TiO_2$ | 2.10 | | 14.7 | 20.8 |
| | 1st layer | $AL_2O_3$ | 1.63 | | 28.9 | 80.5 |
| Base material | | | | Refractive index | 1.613 | 1.497 |

TABLE 2

|  | Materials | Refractive index | Optical effective region 11b, First example | |
|---|---|---|---|---|
| 3rd layer | SiO$_2$ | 1 46 | Physical | 33.0 |
| 2nd layer | AL$_2$O$_3$ | 1.63 | film | 33.5 |
| 1st layer | SiO$_2$ | 1.46 | thickness (nm) | 26.5 |
| Base material | | | Refractive index | 1.613 |

Second Example

The cemented lens 50A illustrated in FIG. 8 was manufactured. As the base material 11, S-NBM51 manufactured by OHARA INC. and having a refractive index at d line (wavelength 587.56 nm) (hereinafter, referred to as nd) of 1.613 was used. As the base material 21, S-FPL51 manufactured by OHARA INC. with nd of 1.497 was used.

Next, a dielectric multilayer film including an Al$_2$O$_3$ layer, a ZrO$_2$+TiO$_2$ layer, and a SiO$_2$ layer was formed as a base layer 13a in the optical effective region 11a of the base material 11. The film thickness of each layer is shown in Table 3. In addition, also in the optical effective region 21b of the base material 21, a dielectric multilayer film including an Al$_2$O$_3$ layer, a ZrO$_2$+TiO$_2$ layer, and a SiO$_2$ layer was formed as the base layer 23b. The film thickness of each layer is shown in Table 3. In addition, a dielectric multilayer film including a SiO$_2$ layer and an Al$_2$O$_3$ layer was formed as the base layer 13b in the optical effective region 11b of the base material 11. The film thickness of each layer is shown in Table 4. On the other hand, no film was particularly formed in the optical effective region 21a of the base material 21. This is because the refractive index of the base material 21 is close to the refractive index of the adhesive used for bonding, and the reflectivity at the interface is sufficiently small. Each of the base layer and the antireflection coating was formed by a vacuum vapor deposition method.

A light shielding coating material GT-7II manufactured by Canon Chemicals Inc. was applied to the non-optical effective region 11c of the base material 11 so as to have a thickness of 5 to 10 μm at the end surface of the base material, and dried and cured at 200° C. for one hour to form a first light shielding film 12 (black coating film). Similarly, a light shielding coating material GT-7II manufactured by Canon Chemicals Inc. was applied to the non-optical effective region 21c of the base material 21 so as to have a thickness of 5 to 10 μm at the end surface of the base material, and dried and cured at 200° C. for one hour to form a second light shielding film 22 (black coating film).

Subsequently, the optical effective region 11b of the base material 11 and the optical effective region 21a of the base material 21 were bonded by the adhesive layer 30 to manufacture the cemented lens 50. Specifically, an adhesive was applied to the optical effective region 11b in a state where the optical effective region 11a of the base material 11 was disposed downward, the base material 21 was disposed at an appropriate position using an optical axis adjustment device while the adhesive was pressed as being sandwiched between the optical effective region 11b of the base material 11 and the optical effective region 21a of the base material 21, and the adhesive layer 30 was cured by irradiation with UV light, and then an excessive adhesive protruding to the flange portion was wiped off and removed. For the adhesive layer 30, a polyene-polythiol adhesive OP-1080L (manufactured by Denka Company Limited) was used. The refractive index of OP-1080L after UV curing, that is, the refractive index of the adhesive layer 30 is 1.52. The thickness of the adhesive layer 30 was made about 10 μm.

Further, the surfaces of the base layer 13a and the base layer 23b of the cemented lens 50A were subjected to RIE treatment (reactive ion etching treatment) with oxygen to improve the wettability of the surfaces of the base layer 13a and the base layer 23b, and then the low refractive index layer 40 was formed on the surfaces of the base layer 13a and the base layer 23b. In the film formation of the low refractive index layer 40, hollow silica particles having a particle size of about 60 nm and a coating liquid prepared by stirring, dissolving, and preparing an acrylic resin as a binder component in a solvent mainly composed of propylene glycol monomethyl ether and propylene glycol were used to simultaneously form the film on the base layer 13a and the base layer 23b by a dip coating method. Thereafter, the formed coating film was left for two hours in a clean room atmosphere at room temperature of 23° C. As a result, a low refractive index layer 40 formed by binding hollow silica particles with an acrylic resin (binder) was obtained. As described above, the cemented lens of the mode illustrated in FIG. 8 was produced as the second example.

TABLE 3

| | | Materials | Refractive index | | Base layer 13a, Second example | Base layer 23b, Second example |
|---|---|---|---|---|---|---|
| Outermost layer | 10th layer | Hollow silica | 1.23 | Physical film thickness (nm) | 115.0 | 115.0 |
| Base layer | 9th layer | SiO$_2$ | 1.46 | | 23.8 | 20.3 |
| | 8th layer | ZrO$_2$ + TiO$_2$ | 2.10 | | 18.8 | 17.5 |
| | 7th layer | SiO$_2$ | 1.46 | | 41.2 | 43.5 |
| | 6th layer | ZrO$_2$ + TiO$_2$ | 2.10 | | 64.9 | 52.9 |
| | 5th layer | SiO$_2$ | 1.46 | | 18.2 | 18.2 |
| | 4th layer | ZrO$_2$ + TiO$_2$ | 2.10 | | 48.8 | 38.3 |
| | 3rd layer | SiO$_2$ | 1.46 | | 36.8 | 18.8 |

TABLE 3-continued

| | Materials | Refractive index | Base layer 13a, Second example | Base layer 23b, Second example |
|---|---|---|---|---|
| 2nd layer | $ZrO_2 + TiO_2$ | 2.10 | 16.4 | 12.6 |
| 1st layer | $AL_2O_3$ | 1.63 | 31.6 | 81.7 |
| Base material | | Refractive index | 1.613 | 1.497 |

TABLE 4

| | Materials | Refractive index | | Base Layer 13b, Second example |
|---|---|---|---|---|
| 3rd layer | $SiO_2$ | 1.46 | Physical film thickness (nm) | 33.0 |
| 2nd layer | $AL_2O_3$ | 1.63 | | 33.5 |
| 1st layer | $SiO_2$ | 1.46 | | 26.5 |
| | Base material | | Refractive index | 1.613 |

Comparative Example

Figure 13:
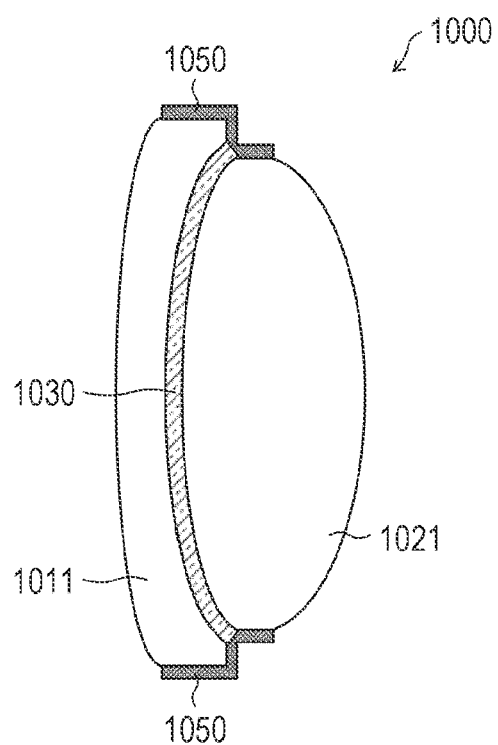
FIG. 13 is a diagram illustrating a comparative configuration.

As a comparative example, a cemented lens 1000 illustrated in FIG. 13 was manufactured. In the cemented lens 1000, a light shielding film was not formed on each of base materials 1011 and 1021, and antireflection coating (not illustrated) was formed on optical effective regions 1011a, 1011b, 1021b of the base materials 1011 and 1012, and then the base materials 1011 and 1021 were cemented via an adhesive layer 1030. For the adhesive layer 1030, a polyene-polythiol adhesive OP-1080L (manufactured by Denka Company Limited) was used. The refractive index of OP-1080L after UV curing, that is, the refractive index of the adhesive layer 1030 is 1.52. The thickness of the adhesive layer 1030 was about 10 μm.

Subsequently, a light shielding coating material GT-7II manufactured by Canon Chemicals Inc. was applied to the non-optical effective region of the joined structure so as to have a thickness of 3 to 5 μm at the end surface of the base material, and left to stand at room temperature of 23° C. for 24 hours for drying and curing, thereby forming a light shielding film 1050 for the comparative example.

[Evaluation]
1. Evaluation Method
The manufactured cemented lens was evaluated according to the following method.
(1) High Temperature Test
Each of the cemented lenses produced in the examples and the comparative example was placed in a thermostatic bath at 80° C. for 240 hours, and then the occurrence state of infiltration of the black-containing component of the light-shielding film into the adhesive layer 30 (1030) was visually observed. Evaluation was performed according to the following criteria.
◯: No discoloration was confirmed in the adhesive layer.
X: Discoloration (yellow color) was confirmed in the adhesive layer.
(2) Wiping Test
A wiping test was performed on the cemented lens 50 of the first example and the cemented lens 1000 of the comparative example.
In the wiping test, the surface of the light shielding film of the cemented lens was wiped with a load of 50 g using a nonwoven fabric (polyester wiper, AS ONE Corporation) impregnated with isopropyl alcohol, and then the surface of the wiper was visually confirmed to evaluate the elution of the black coating film.
◯: No discoloration was observed in the wiper after wiping.
X: The wiper turned black or yellow after wiping.
(3) High Humidity and High Temperature Test
Each of the cemented lenses produced in the examples and the comparative example was placed in a constant temperature and humidity bath at 60° C. and 90 RH % for 240 hours, then taken out into an environment at 23° C. and 50 RH %, and after taking out, the occurrence state of whitening in the outer peripheral portion of the cemented lens was visually observed. Evaluation was performed according to the following criteria.
◯: No whitening was confirmed in the outer peripheral portion of the cemented lens.
X: Whitening was confirmed in the outer peripheral portion of the cemented lens.
2. Evaluation Results
The results of the evaluations of (1) to (3) described above for the cemented lenses produced in the examples and the comparative example are shown in Table 5 below.

TABLE 5

| | High temperature test | Wiping test | High temperature and high humidity test |
|---|---|---|---|
| First Example | ◯ | ◯ | ◯ |
| Second Example | ◯ | — | ◯ |
| Comparative example | X | X | X |

From the above results, it has been confirmed that the cemented lens according to one aspect of the present invention suppresses deterioration in optical performance due to a change in the quality of the adhesive layer, and has resistance to the cleaning step and resistance to environmental change.

Note that, in the first and second examples, a case of the cemented lens in which two optical elements are bonded together has been described, but the present invention is not limited thereto. The present invention is also applicable to a cemented lens in which three or more optical elements (lenses) are bonded together.

What is claimed is:
1. A cemented lens comprising:
a first optical element in which a first light shielding film is formed in a non-optical effective region of a base material;
a second optical element in which a second light shielding film is formed in a non-optical effective region of a base material; and an adhesive layer that bonds an optical effective region of the first optical element and an optical effective region of the second optical element to each other, wherein the adhesive layer is exposed from between the first light shielding film and the second light shielding film, and the adhesive layer is exposed to air on a surface of the first light shielding film formed in the non-optical effective region of the first optical element and on a surface of the second light shielding film formed in the non-optical effective region of the second optical element.

2. The cemented lens according to claim 1, wherein at least one selected from groups consisting of (i) optical effective regions of the cemented lens, (ii) the first light shielding film and the second light shielding film, and (iii) the exposed portion of the adhesive layer is covered with a low refractive index layer having a refractive index of 1.15 to 1.35.

3. The cemented lens according to claim 2, wherein the low refractive index layer is selected from groups consisting of SiO2, MgF2, and Al2O3.

4. The cemented lens according to claim 2, wherein the low refractive index layer is a layer in which hollow silica particles having a balloon structure including an outer shell portion made of silica and a hollow portion surrounded by the outer shell portion are bound by a binder and there is a void portion other than the hollow portion of the hollow silica particles, and an average particle diameter of the hollow silica particle is 5 nm or more and 100 nm or less.

5. The cemented lens according to claim 4, wherein the low refractive index layer is a layer formed using the hollow silica particles and a resin material or a metal alkoxide as a component of the binder.

6. The cemented lens according to claim 2, further comprising a base layer in which one or more thin films made of a transparent material having a refractive index of 1.35 to 2.5 are laminated in the optical effective regions of the cemented lens, wherein the low refractive index layer is laminated on the base layer.

7. The cemented lens according to claim 6, wherein the base layer is a film manufactured by a vacuum vapor deposition method, a sputtering method, or an ALD method.

8. An optical system comprising the cemented lens according to claim 1.

9. An optical device comprising:
the cemented lens according to claim 1; and
a light receiving element configured to receive light condensed by the cemented lens.

10. A method of manufacturing a cemented lens, the method comprising bonding an optical effective region of a first optical element in which a first light shielding film is formed in a non-optical effective region of a base material and an optical effective region of a second optical element in which a second light shielding film is formed in a non-optical effective region of a base material to each other with an adhesive layer interposed therebetween, wherein the adhesive layer is exposed to air on a surface of the first light shielding film formed in the non-optical effective region of the first optical element and on a surface of the second light shielding film formed in the non-optical effective region of the second optical element.

\* \* \* \* \*